United States Patent
Bafna et al.

(10) Patent No.: US 11,765,065 B1
(45) Date of Patent: Sep. 19, 2023

(54) SYSTEM AND METHOD FOR SCALABLE TELEMETRY

(71) Applicant: Nutanix, Inc., San Jose, CA (US)

(72) Inventors: Mukesh Bafna, Pune (IN); Akshay Narayan Muramatti, Santa Clara, CA (US); Pranjal Bhor, Pune (IN); Amey Barve, Pune (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/835,625

(22) Filed: Jun. 8, 2022

Related U.S. Application Data

(60) Provisional application No. 63/322,972, filed on Mar. 23, 2022.

(51) Int. Cl.
*H04L 43/16* (2022.01)
*H04L 43/0817* (2022.01)

(52) U.S. Cl.
CPC .......... *H04L 43/16* (2013.01); *H04L 43/0817* (2013.01)

(58) Field of Classification Search
CPC .... H04L 43/16; H04L 43/0817; H04L 43/106
USPC ....................................... 709/224
See application file for complete search history.

(56) References Cited

U.S. PATENT DOCUMENTS

| | | | |
|---|---|---|---|
| 7,555,046 B2 | 6/2009 | Zoghlami et al. | |
| 8,549,518 B1 | 10/2013 | Aron et al. | |
| 8,561,175 B2 | 10/2013 | Williams et al. | |
| 8,601,473 B1 | 12/2013 | Aron et al. | |
| 8,682,918 B2 | 3/2014 | Ramanujam | |
| 8,745,214 B2 | 6/2014 | Inamdar et al. | |
| 8,850,130 B1 | 9/2014 | Aron et al. | |
| 8,863,124 B1 | 10/2014 | Aron | |
| 8,875,129 B2 | 10/2014 | Wagner et al. | |
| 8,909,766 B1 | 12/2014 | Hegg et al. | |
| 9,009,106 B1 | 4/2015 | Aron et al. | |
| 9,069,708 B2 | 6/2015 | Gill et al. | |

(Continued)

FOREIGN PATENT DOCUMENTS

| | | |
|---|---|---|
| CN | 114026834 | 2/2022 |
| EP | 3 128 475 | 2/2017 |

(Continued)

OTHER PUBLICATIONS

Netapp, "Active IQ Blog," (May 28, 2020), https://www.netapp.com/blog/data-management-active-iq/, pp. 1-9.

(Continued)

*Primary Examiner* — Meng Vang
(74) *Attorney, Agent, or Firm* — Foley & Lardner LLP

(57) ABSTRACT

Various embodiments disclosed herein are related to an apparatus. In some embodiments, the apparatus includes a processor and a memory. In some embodiments, the memory includes programmed instructions that, when executed by the processor, cause the apparatus to receive an indication that an entity state of an entity has been updated, and, in response to receiving the indication that the entity has been updated, determine that the number of updates of the entity within a time period exceeds a threshold. In some embodiments, the memory includes the programmed instructions that, when executed by the processor, cause the apparatus to determine that the time period has expired, and, in response to determining that the time period has expired, collect the entity state of the entity.

28 Claims, 10 Drawing Sheets

(56) References Cited

U.S. PATENT DOCUMENTS

| | | | |
|---|---|---|---|
| 9,218,176 | B1 | 12/2015 | Alberti et al. |
| 9,305,008 | B2 | 4/2016 | Mensch et al. |
| 9,323,579 | B2 | 4/2016 | Parikh |
| 9,336,132 | B1 | 5/2016 | Aron et al. |
| 9,413,616 | B2 | 8/2016 | Nguyen et al. |
| 9,419,856 | B1 | 8/2016 | Chawla et al. |
| 9,459,926 | B2 | 10/2016 | Shakirzyanov et al. |
| 9,633,037 | B2 | 4/2017 | Smith et al. |
| 9,652,265 | B1 | 5/2017 | Narayanasamy et al. |
| 9,652,485 | B1 | 5/2017 | Bhargava et al. |
| 9,747,287 | B1 | 8/2017 | Bhardwaj et al. |
| 9,772,866 | B1 | 9/2017 | Aron et al. |
| 9,799,082 | B1 | 10/2017 | Raskin et al. |
| 9,817,651 | B2 | 11/2017 | Viswanathan et al. |
| 9,942,034 | B2 | 4/2018 | Le Saint et al. |
| 10,007,513 | B2 | 6/2018 | Malladi et al. |
| 10,007,710 | B2 | 6/2018 | Chen et al. |
| 10,027,728 | B2 | 7/2018 | Yang et al. |
| 10,061,464 | B2 | 8/2018 | Addala et al. |
| 10,114,882 | B2 | 10/2018 | Lipstone |
| 10,158,534 | B2 | 12/2018 | Acharya et al. |
| 10,178,021 | B1 | 1/2019 | Devillard et al. |
| 10,313,474 | B1 | 6/2019 | Farrugia et al. |
| 10,432,699 | B2 | 10/2019 | Griffith et al. |
| 10,503,427 | B2 | 12/2019 | Botes et al. |
| 10,567,262 | B1 * | 2/2020 | Mutnuru ............... H04L 43/08 |
| 10,585,908 | B2 | 3/2020 | Russell |
| 10,713,079 | B2 | 7/2020 | Muramatti et al. |
| 10,785,122 | B2 | 9/2020 | Inamdar et al. |
| 10,791,421 | B1 | 9/2020 | Rothschild et al. |
| 11,055,273 | B1 | 7/2021 | Meduri et al. |
| 11,061,729 | B2 | 7/2021 | Singh et al. |
| 11,082,525 | B2 | 8/2021 | Sethuraman et al. |
| 2005/0055575 | A1 | 3/2005 | Evans et al. |
| 2008/0126773 | A1 | 5/2008 | Martinez et al. |
| 2010/0162374 | A1 | 6/2010 | Nair |
| 2011/0007748 | A1 | 1/2011 | Yin et al. |
| 2011/0280134 | A1 | 11/2011 | Zheng |
| 2012/0089410 | A1 | 4/2012 | Mikurak |
| 2012/0271926 | A1 | 10/2012 | Shakirzyanov et al. |
| 2013/0013921 | A1 | 1/2013 | Bhathena et al. |
| 2013/0103834 | A1 | 4/2013 | Dzerve et al. |
| 2014/0317273 | A1 | 10/2014 | Kruglick |
| 2014/0372376 | A1 | 12/2014 | Smith et al. |
| 2015/0180714 | A1 | 6/2015 | Chunn et al. |
| 2015/0193220 | A1 | 7/2015 | Rork et al. |
| 2015/0220331 | A1 | 8/2015 | Bernstein et al. |
| 2015/0277942 | A1 | 10/2015 | Rork et al. |
| 2015/0281285 | A1 | 10/2015 | Bharali et al. |
| 2015/0281374 | A1 | 10/2015 | Petersen et al. |
| 2015/0286475 | A1 | 10/2015 | Vangelov et al. |
| 2015/0288636 | A1 | 10/2015 | Yalavarty et al. |
| 2016/0085772 | A1 | 3/2016 | Vermeulen et al. |
| 2016/0105370 | A1 | 4/2016 | Mellor et al. |
| 2016/0205189 | A1 | 7/2016 | Mopur et al. |
| 2016/0253710 | A1 | 9/2016 | Publicover et al. |
| 2016/0259598 | A1 * | 9/2016 | Ikeuchi ............... G06F 3/0604 |
| 2016/0292166 | A1 | 10/2016 | Russell |
| 2016/0294605 | A1 | 10/2016 | Searle et al. |
| 2017/0048694 | A1 * | 2/2017 | Nafe ................. H04W 8/24 |
| 2017/0085447 | A1 | 3/2017 | Chen et al. |
| 2017/0172473 | A1 * | 6/2017 | Wedekind .......... A61B 5/14532 |
| 2017/0318113 | A1 | 11/2017 | Ganichev et al. |
| 2017/0373930 | A1 | 12/2017 | Danilov et al. |
| 2018/0012032 | A1 | 1/2018 | Radich et al. |
| 2018/0131770 | A1 | 5/2018 | Doraiswamy et al. |
| 2018/0136862 | A1 | 5/2018 | Rusenas et al. |
| 2018/0159833 | A1 | 6/2018 | Zhang et al. |
| 2018/0167203 | A1 | 6/2018 | Belenko |
| 2018/0167275 | A1 | 6/2018 | Kovacheva et al. |
| 2018/0176073 | A1 | 6/2018 | Dubey et al. |
| 2018/0176663 | A1 | 6/2018 | Damaggio |
| 2018/0183684 | A1 * | 6/2018 | Jacobson ............ H04L 12/2803 |
| 2018/0234337 | A1 | 8/2018 | Goliya et al. |
| 2018/0278541 | A1 | 9/2018 | Wu et al. |
| 2018/0302442 | A1 | 10/2018 | Lucovsky et al. |
| 2018/0330079 | A1 | 11/2018 | Gray |
| 2018/0332061 | A1 * | 11/2018 | Terada ................ G06F 21/552 |
| 2019/0050301 | A1 | 2/2019 | Juniwal et al. |
| 2019/0052659 | A1 | 2/2019 | Weingarten et al. |
| 2019/0058626 | A1 | 2/2019 | Knowles et al. |
| 2019/0058643 | A1 | 2/2019 | Knowles et al. |
| 2019/0065292 | A1 | 2/2019 | Yu et al. |
| 2019/0065508 | A1 | 2/2019 | Guturi et al. |
| 2019/0073378 | A1 | 3/2019 | Guturi et al. |
| 2019/0109872 | A1 | 4/2019 | Dhakshinamoorthy et al. |
| 2019/0123928 | A1 | 4/2019 | Aston |
| 2019/0213089 | A1 | 7/2019 | Podge et al. |
| 2019/0220361 | A1 | 7/2019 | Mageswaran et al. |
| 2019/0281132 | A1 | 9/2019 | Sethuraman et al. |
| 2019/0303900 | A1 | 10/2019 | Golberg |
| 2019/0306121 | A1 | 10/2019 | Anderson et al. |
| 2019/0340168 | A1 | 11/2019 | Raman et al. |
| 2020/0004523 | A1 | 1/2020 | Eroshkina et al. |
| 2020/0026505 | A1 | 1/2020 | Olderdissen |
| 2020/0065317 | A1 | 2/2020 | Sarkar et al. |
| 2020/0073656 | A1 | 3/2020 | Satapathy et al. |
| 2020/0104222 | A1 | 4/2020 | Ramamoorthi et al. |
| 2020/0125454 | A1 | 4/2020 | Naidu et al. |
| 2020/0136920 | A1 | 4/2020 | Doshi et al. |
| 2020/0151325 | A1 | 5/2020 | Chen et al. |
| 2020/0151327 | A1 | 5/2020 | Chen et al. |
| 2020/0159560 | A1 | 5/2020 | Safreno et al. |
| 2020/0192640 | A1 | 6/2020 | Lucas et al. |
| 2020/0236168 | A1 | 7/2020 | Todd |
| 2020/0249938 | A1 | 8/2020 | Shin et al. |
| 2020/0249979 | A1 | 8/2020 | Muramatti et al. |
| 2020/0264928 | A1 | 8/2020 | Kalmuk et al. |
| 2020/0314065 | A1 * | 10/2020 | Roy ................... H04L 63/0209 |
| 2020/0342092 | A1 | 10/2020 | Wei et al. |
| 2020/0351192 | A1 | 11/2020 | Murao |
| 2020/0409339 | A1 | 12/2020 | Arashanipalai et al. |
| 2020/0409810 | A1 | 12/2020 | Wu et al. |
| 2020/0412615 | A1 | 12/2020 | Baskaran et al. |
| 2021/0004270 | A1 | 1/2021 | Singh et al. |
| 2021/0004297 | A1 | 1/2021 | Scrivner et al. |
| 2021/0014132 | A1 | 1/2021 | Smith et al. |
| 2021/0036886 | A1 * | 2/2021 | Patel .................. H04L 12/40 |
| 2021/0136146 | A1 | 5/2021 | Welsch et al. |
| 2021/0203732 | A1 | 7/2021 | Webb et al. |
| 2021/0243094 | A1 | 8/2021 | Holness et al. |
| 2021/0389894 | A1 | 12/2021 | Zhou et al. |
| 2022/0070193 | A1 * | 3/2022 | Konda ................ G06N 3/0454 |

FOREIGN PATENT DOCUMENTS

| | | | | |
|---|---|---|---|---|
| EP | 3 591 938 A1 | | 1/2020 | |
| JP | 2018-533285 A | | 11/2018 | |
| WO | WO-2015114384 A1 * | | 8/2015 | ......... G06K 19/0705 |

OTHER PUBLICATIONS

Netapp, "NetApp Active IQ," https://www.netapp.com/pdf.html?item=/media/9279-sb-3992.pdf, pp. 1-3.

Netapp, "NetApp Blog | We are the cloud storage specialists," https://www.netapp.com/blog/#q=RipWilson&t=Blogs&sort=relevancy&layout=card&f:@facet_language_mktg=[English], pp. 1-8.

Non-Final Office Action on U.S. Appl. No. 17/127,857 dated Feb. 3, 2023.

Final Office Action on U.S. Appl. No. 17/508,620 dated Nov. 29, 2022.

"Active IQ Digital Advisor: Simple, intelligent, storage health"; NetApp Active IQ—Actionable Intelligence; https://www.netapp.com/services/support/active-iq/; Accessed on Oct. 15, 2020.

"AWS for the Edge"; Amazon Web Services; https://aws.amazon.com/edge/?trk=ps_a134p000003ymOnAAI&trkcampaign=pac_paids; Accessed on Oct. 15, 2020.

"Bringing Intelligence to the Edge," https://www.redhat.com/en/blog/bringing-intelligence-edge, pp. 1-1.

"Build Intelligence on the Router Using AI-Driven Telemetry," https://www.cisco.com/c/en/us/td/docs/iosxr/ncs5500/telemetry/73x/b-telemetry-cg-ncs5500-73x/AI-driven-telemetry.html, pp. 1-12.

(56) References Cited

OTHER PUBLICATIONS

"Cloud Insights"; Cloud Central; Cloud Insights—Monitor Optimize Your Hybrid Infrastructure; https://cloud.netapp.com/cloud-insights; Accessed on Oct. 15, 2020.
"Creating a SnapMirror policy to maximize transfer efficiency," docs.netapp.com/ocum-72/index.jsp?topic=%2Fcom.netapp.doc.oncum-ag%2FGUID-657A296F-72A8-444D-BF77-E791BFE1E6B3.html, pp. 1-2.
"Manage data streams on the AWS IoT Greengrass Core," https://docs.aws.amazon.com/greengrass/v2/developerguide/manage-data-streams.html, pp. 1-2.
"Nutanix Insights Pulse Feature?"; HyperHCI Tech Blog; https://hyperhci.com/2019/09/13/nutanix-insights-pulse-feature/; Accessed on Oct. 21, 2020.
"Prioritize critical messages from your edge device to the Cloud," https://techcommunity.microsoft.com/t5/internet-of-things-blog/prioritize-critical-messages-from-your-edge-device-to-the-cloud/ba-p/1777959, pp. 1-1.
"Priority and time-to-live," https://docs.microsoft.com/en-us/azure/iot-edge/module-composition?view=iotedge-2020-11#priority-and-time-to-live, pp. 1-1.
"Reconciliation strategy|Config Connector Documentation|Google Cloud," https://cloud.google.com/config-connector/docs/concepts/reconciliation, pp. 1-2.
"Release Notes|NCC 4.4.0," pp. 1-10.
"What is data parsing?"; Device Management—Alibaba Cloud Documentation Center; https://www.alibabacloud.com/help/doc-detail/68702.htm; Accessed Nov. 17, 2020.
"What is vSAN Support Insight _ Quick Overview—Virtually Sensei," (Oct. 11, 2018), https://www.virtuallysensei.com/vsan-support-insight/, pp. 1-10.
Bryant Paul, "VMware Bringing SASE to SD-WAN VMworld 2020—Digital Thought Disruption," (Sep. 29, 2020), https://digitalthoughtdisruption.com/2020/09/29/vmware-bringing-sase-to-sd-wan-vmworld-2020/, pp. 1-10.
Cano, Ignacio, et al. "Curator: Self-Managing Storage for Enterprise Clusters" (Mar. 27, 2017), from https://www.usenix.org/conference/nsdi17/.
Dellemc White Paper, "Telemetry Streaming with iDRAC9 Server—Telemetry Performance Reports," Nov. 2020, 10 pages.
Fay Joe, "Waiting for Red Hat OpenShift 4.0_Too late, 4.1 has already arrived . . . • DEVCLASS," (Jun. 5, 2019), https://devclass.com/2019/06/05/red-hat-openshift-4-1-has-already-arrived/, pp. 1-2.
Google Cloud, "Release Notes Cloud Pub/Sub Documentation," https://cloud.google.com/pubsub/docs/release-notes, pp. 1-13.
Google Cloud, "What is Pub/Sub," https://cloud.google.com/pubsub/docs/overview, pp. 1-7.
Hindawi, "Management of IoT Sensor Data Using a Fog Computing Node," https://doi.org/10.1155/2019/5107457, pp. 1-10.
Julia White; "Enabling intelligent cloud and intelligent edge solutions for government"; Cloud Strategy; https://azure.microsoft.com/en-us/blog/enabling-intelligent-cloud-and-intelligent-edge-solutions-for-government/; Accessed on Oct. 15, 2020.
Netapp, "Active IQ Unified Manager 9.7 is now available!," https://www.netapp.com/blog/active-iq-unified-manager-9-7/, pp. 1-9.
Netapp, "What is the difference between SnapMirror 'normal' and 'low' priority," https://kb.netapp.com/Advice_and_Troubleshooting/Data_Protection_and_Security/SnapMirror/What_is_the_difference_between_SnapMirror_, pp. 1-2.
Nutanix, "Logbay Tags Reference Guide for Nutanix Cluster Check (NCC) 4.4.0," (Dec. 15, 2021), pp. 1-288.
Nutanix, "NCC Checks Reference," (Dec. 15, 2021), pp. 1-195.
Nutanix, "Nutanix Cluster Check (NCC) 4.4.0 Guide," (Dec. 15, 2021), pp. 1-39.
Nutanix, "Nutanix Insights: Simplifying IT Support Operations," pp. 1-2.
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Sep. 17, 2019), from https://nutanixbible.com/.
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Prashant Batra; "Announcing Nutanix Insights—Predictive Health & Support Automation Service"; https://www.nutanix.com/blog/announcing-nutanix-insights-predictive-health-support-automation-service; Accessed Oct. 21, 2020.
Slattery, Terry, "Telemetry vs. SNMP: Is one better for network management," https://www.techtarget.com/searchnetworking/answer/Telemetry-vs-SNMP-Is-one-better-for-network-management, pp. 1-4.
Tham, Chen-Khong, "Active Learning for IoT Data Prioritization in Edge Nodes Over Wireless Networks," https://ieeexplore.ieee.org/document/9255294, pp. 1-6.
VMware, "Configure log forwarding from Tanzu Kubernetes Grid (TKG) to vRealize Log Insight Cloud," (Apr. 27, 2020), https://williamlam.com/2020/04/configure-log-forwarding-from-tanzu-kubernetes-grid-tkg-to-vrealize-log-insight-cloud.html, pp. 1-12.
VMware, "Mark Traffic on a Distributed Port Group or Uplink Port Group," https://docs.vmware.com/en/VMware-vSphere/7.0/com.vmware.vsphere.networking.doc/GUID-84207BEA-986E-443E-94B0-B1EC66C56598.html, pp. 1-4.
VMware, "Try Wavefront by VMware Today!—Vmware Cloud Management," (Aug. 4, 2017), https://blogs.vmware.com/management/2017/08/try-wavefront-today.html, pp. 1-6.
VMware, "VMware SD-WAN Dynamic Multipath Optimization (DMPO) (2733094)," https://kb.vmware.com/s/article/2733094, pp. 1-15.
VMware, "VMware Smart Assurance Datasheet," pp. 1-4.
VMware, "VMware Tanzu at the Edge: Solution Architecture for ROBO Topology," (Oct. 1, 2020), https://tanzu.vmware.com/content/blog/vmware-tanzu-at-the-edge-solution-architecture-for-robo-topology, pp. 1-6.
VMware, "Why is Operational Anomaly Detection So Hard?—Cloud Blog—VMware" (Apr. 21, 2016), https://blogs.vmware.com/cloud/2016/04/21/operational-anomaly-detection-hard/, pp. 1-8.
VMware, Configure Log forwarding from VMware Tanzu Kubernetes Cluster to vRealize Log Insight Cloud—VMware Cloud Management, (Jun. 11, 2020), https://blogs.vmware.com/management/2020/06/configure-log-forwarding-from-vmware-tanzu-kubernetes-cluster-to-vrealize-log-insight-cloud.html, 1-9 pages.

* cited by examiner

SYSTEM AND METHOD FOR SCALABLE TELEMETRY

CROSS-REFERENCE TO RELATED APPLICATION

This application is related to and claims priority under 35 U.S. § 119(e) from U.S. Provisional Application No. 63/322,972, filed Mar. 23, 2022, titled "SCALABLE TELEMETRY," the entire contents of which are incorporated herein by reference for all purposes.

BACKGROUND

Telemetry can be the collection of measurements or other data at remote or inaccessible points and their automatic transmission to receiving equipment for monitoring. As business progresses through digital transformation and the line between business process and technology continue to blur, telemetry from across the data path can provide insights into both technical and business problems. As organizations may be increasingly reliant on applications to execute business—internally and externally, with customers and partners—the volume of telemetry data grows larger and larger.

SUMMARY

Various embodiments disclosed herein are related to an apparatus. In some embodiments, the apparatus includes a processor and a memory. In some embodiments, the memory includes programmed instructions that, when executed by the processor, cause the apparatus to receive an indication that an entity state of an entity has been updated. In some embodiments, the memory includes the programmed instructions that, when executed by the processor, cause the apparatus to, in response to receiving the indication that the entity has been updated, determine that the number of updates of the entity within a time period exceeds a threshold. In some embodiments, the memory includes the programmed instructions that, when executed by the processor, cause the apparatus to determine that the time period has expired. In some embodiments, the memory includes the programmed instructions that, when executed by the processor, cause the apparatus to, in response to determining that the time period has expired, collect the entity state of the entity.

In some embodiments, the memory includes programmed instructions that, when executed by the processor, cause the apparatus to receive, from a data source, the indication that the entity state of the entity has been updated. In some embodiments, the data source is coupled to the entity. In some embodiments, the memory includes programmed instructions that, when executed by the processor, cause the apparatus to collect the entity state from the data source that provided the indication that the entity state of the entity has been updated.

In some embodiments, at least one of the time period or the threshold is based on an entity type that the entity is a member of. In some embodiments, the memory includes the programmed instructions that, when executed by the processor, cause the apparatus to determine that the entity type is not included in a whitelist. In some embodiments, the entity type is at least one of a task, a virtual machine, a virtual disk, or a virtual network interface card.

In some embodiments, the memory includes the programmed instructions that, when executed by the processor, cause the apparatus to receive a second indication that the entity state of the entity has been updated. In some embodiments, the memory includes the programmed instructions that, when executed by the processor, cause the apparatus to, in response to receiving the second indication that the entity state of the entity has been updated, determine that the number of updates of the entity within the time period does not exceed a threshold. In some embodiments, the memory includes the programmed instructions that, when executed by the processor, cause the apparatus to, in response to determining that the number of updates of the entity within the time period does not exceed the threshold, collect the entity state of the entity.

In some embodiments, the memory includes the programmed instructions that, when executed by the processor, cause the apparatus to receive, from a server, a whitelist configuration. In some embodiments, the whitelist configuration specifies an entity type accepted by the server. In some embodiments, the memory includes the programmed instructions that, when executed by the processor, cause the apparatus to collect, based on the whitelist configuration, telemetry data corresponding to the entity type accepted by the server. In some embodiments, the memory includes the programmed instructions that, when executed by the processor, cause the apparatus to send the collected telemetry data to the server.

Various embodiments disclosed herein are related to a non-transitory computer readable storage medium. In some embodiments, the medium includes instructions stored thereon that, when executed by a processor, cause the processor to receive an indication that an entity state of an entity has been updated. In some embodiments, the medium includes the instructions stored thereon that, when executed by the processor, cause the processor to, in response to receiving the indication that the entity has been updated, determine that the number of updates of the entity within a time period exceeds a threshold. In some embodiments, the medium includes the instructions stored thereon that, when executed by the processor, cause the processor to determine that the time period has expired. In some embodiments, the medium includes the instructions stored thereon that, when executed by the processor, cause the processor to, in response to determining that the time period has expired, collect the entity state of the entity.

In some embodiments, the medium includes the instructions stored thereon that, when executed by the processor, cause the processor to receive, from a data source, the indication that the entity state of the entity has been updated. In some embodiments, the data source is coupled to the entity. In some embodiments, the medium includes the instructions stored thereon that, when executed by the processor, cause the processor to collect the entity state from the data source that provided the indication that the entity state of the entity has been updated.

In some embodiments, at least one of the time period or the threshold is based on an entity type that the entity is a member of. In some embodiments, the memory includes the programmed instructions that, when executed by the processor, cause the apparatus to determine that the entity type is not included in a whitelist. In some embodiments, the entity type is at least one of a task, a virtual machine, a virtual disk, or a virtual network interface card.

In some embodiments, the medium includes the instructions stored thereon that, when executed by the processor, cause the processor to receive a second indication that the entity state of the entity has been updated. In some embodiments, the medium includes the instructions stored thereon that, when executed by the processor, cause the processor to, in response to receiving the second indication that the entity state of the entity has been updated, determine that the number of updates of the entity within the time period does not exceed a threshold. In some embodiments, the medium includes the instructions stored thereon that, when executed by the processor, cause the processor to, in response to determining that the number of updates of the entity within the time period does not exceed the threshold, collect the entity state of the entity.

In some embodiments, the medium includes the instructions stored thereon that, when executed by the processor, cause the processor to receive, from a server, a whitelist configuration. In some embodiments, the whitelist configuration specifies an entity type accepted by the server. In some embodiments, the medium includes the instructions stored thereon that, when executed by the processor, cause the processor to collect, based on the whitelist configuration, telemetry data corresponding to the entity type accepted by the server. In some embodiments, the medium includes the instructions stored thereon that, when executed by the processor, cause the processor to send the collected telemetry data to the server.

Various embodiments disclosed herein are related to a computer-implemented method. In some embodiments, the method includes receiving an indication that an entity state of an entity has been updated. In some embodiments, the method includes, in response to receiving the indication that the entity has been updated, determining that the number of updates of the entity within a time period exceeds a threshold. In some embodiments, the method includes determining that the time period has expired. In some embodiments, the method includes, in response to determining that the time period has expired, collecting the entity state of the entity.

In some embodiments, the method includes receiving, from a data source, the indication that the entity state of the entity has been updated. In some embodiments, the data source is coupled to the entity. In some embodiments, the method includes collecting the entity state from the data source that provided the indication that the entity state of the entity has been updated.

In some embodiments, at least one of the time period or the threshold is based on an entity type that the entity is a member of. In some embodiments, the method includes determining that the entity type is not included in a whitelist. In some embodiments, the entity type is at least one of a task, a virtual machine, a virtual disk, or a virtual network interface card.

In some embodiments, the method includes receiving a second indication that the entity state of the entity has been updated. In some embodiments, the method includes, in response to receiving the second indication that the entity state of the entity has been updated, determining that the number of updates of the entity within the time period does not exceed a threshold. In some embodiments, the method includes, in response to determining that the number of updates of the entity within the time period does not exceed the threshold, collecting the entity state of the entity.

In some embodiments, the method includes receiving, from a server, a whitelist configuration. In some embodiments, the whitelist configuration specifies an entity type accepted by the server. In some embodiments, the method includes collecting, based on the whitelist configuration, telemetry data corresponding to the entity type accepted by the server. In some embodiments, the method includes sending the collected telemetry data to the server.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Figure 1:
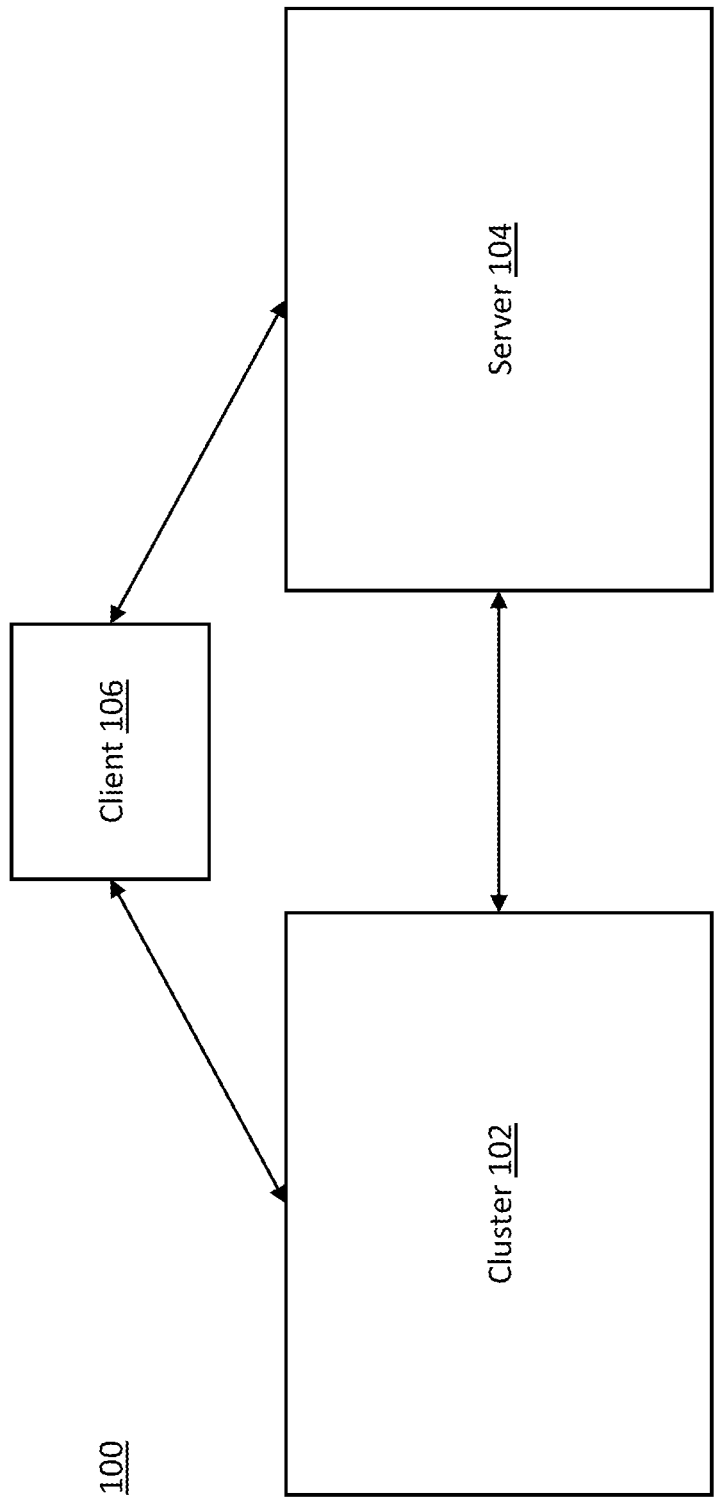
FIG. 1 is an example block diagram of a system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In a scale environment with a number of entities, if an entity gets updated, then that event may trigger an update callback in which the latest state of that entity is captured and forwarded to a collector framework service (CFS). If such an entity gets updated frequently, then the data collection and forwarding can occur at the same frequency. The updating, collecting, and forwarding can lead to a large amount of data to be transported to CFS via storage (e.g., logs such as commit-logs). What is needed is a way to limit the amount of data that is collected from callbacks such that the collectors do not overwhelm the CFS with large amounts of data while collecting important information.

Disclosed herein are embodiments of a system and method that dynamically switches a collection mode for an entity from callback mode to polling mode depending on a number of updates by the entity in a specific amount of time. Dynamic polling can refer to polling under some conditions or behavior of the underlying entity and not polling (e.g., using another mechanism such as callbacks instead of polling) under some other conditions or behavior of the underlying entity. Dynamic polling can include collecting telemetry data from an entity type using a callback mode, determining that a number of updates from the entity type exceeds a threshold, and switching to a polling mode. The callback mode can include a collector registering a watch on an entity type and receiving a callback when an entity of the entity type is updated. The polling mode can include the collector periodically querying or polling the state of an entity of the entity type. In some embodiments, an entity may bypass dynamic polling in response to being included in a whitelist.

Advantageously, the system and method can reduce telemetry data collected from entities which update at a frequency sufficient to create telemetry data in excess of what can be processed by a server or intermediary. In some embodiments, the amount of telemetry data collected from high-frequency entities is reduced using dynamic polling. Advantages of dynamically switching between a callback mode and a polling mode for collecting telemetry data may include allowing a collector to automatically control how telemetry data is collected and sent to a server such that the collector or an intermediary is not overwhelmed with telemetry data. For example, dynamically switching from a callback method to a polling method may allow a collector to avoid sending to a server or an intermediary telemetry data that is collected too quickly for the server or intermediary to process. In addition, by dynamically polling, the system and method can reduce usage of compute, memory, and storage resources at the cluster and the server, as well as increase available network bandwidth.

In some embodiments, edge systems (e.g., clusters) run different versions of software and are configured to send telemetry data such as configuration files, alerts, metrics, events, and logs. In some cases, telemetry data is no longer required, or server-side use cases are not defined. In some embodiments, the server pipeline accepts needed telemetry data and drops unwanted telemetry data at receiver/consumer stage. In addition, some edge clusters send aggregate telemetry data, such as real-time telemetry data, historical telemetry data, and metering data to multiple server (pipelines). However, each server may only accept telemetry data relevant for its use cases and drop the rest. Also, edge systems that send telemetry data to server may not have correct licenses installed and telemetry data coming from such clusters may be dropped at the server. The telemetry data that is dropped by the server in each of these cases can result in wasted compute and network resources for customer-owned (edge) clusters and a third-party-owned server.

Disclosed herein are embodiments of a system and method to periodically sync each server whitelisting configuration to edge systems such that non-whitelisted telemetry data gets dropped at the cluster. Embodiments of the system and method can include synchronizing edge to server to get server's whitelist configuration, determining what telemetry data is on the whitelist, and collecting on the edge only the telemetry data that is on the whitelist. In some embodiments, whitelist configuration can be updated. Advantageously, dropping the telemetry data at the cluster can result in less usage of compute, network, storage, and memory resources for unwanted telemetry data.

FIG. 1 is an example block diagram of a system 100, in accordance with some embodiments of the present disclosure. The system 100 includes a cluster 102, a server 104 in communication with the cluster 102, and a client 106 in communication with the cluster 102 and the server 104. In some embodiments, the system 100 includes two or more clusters 102, and each cluster 102 is in communication with the server 104 and the client 106.

Figure 2:
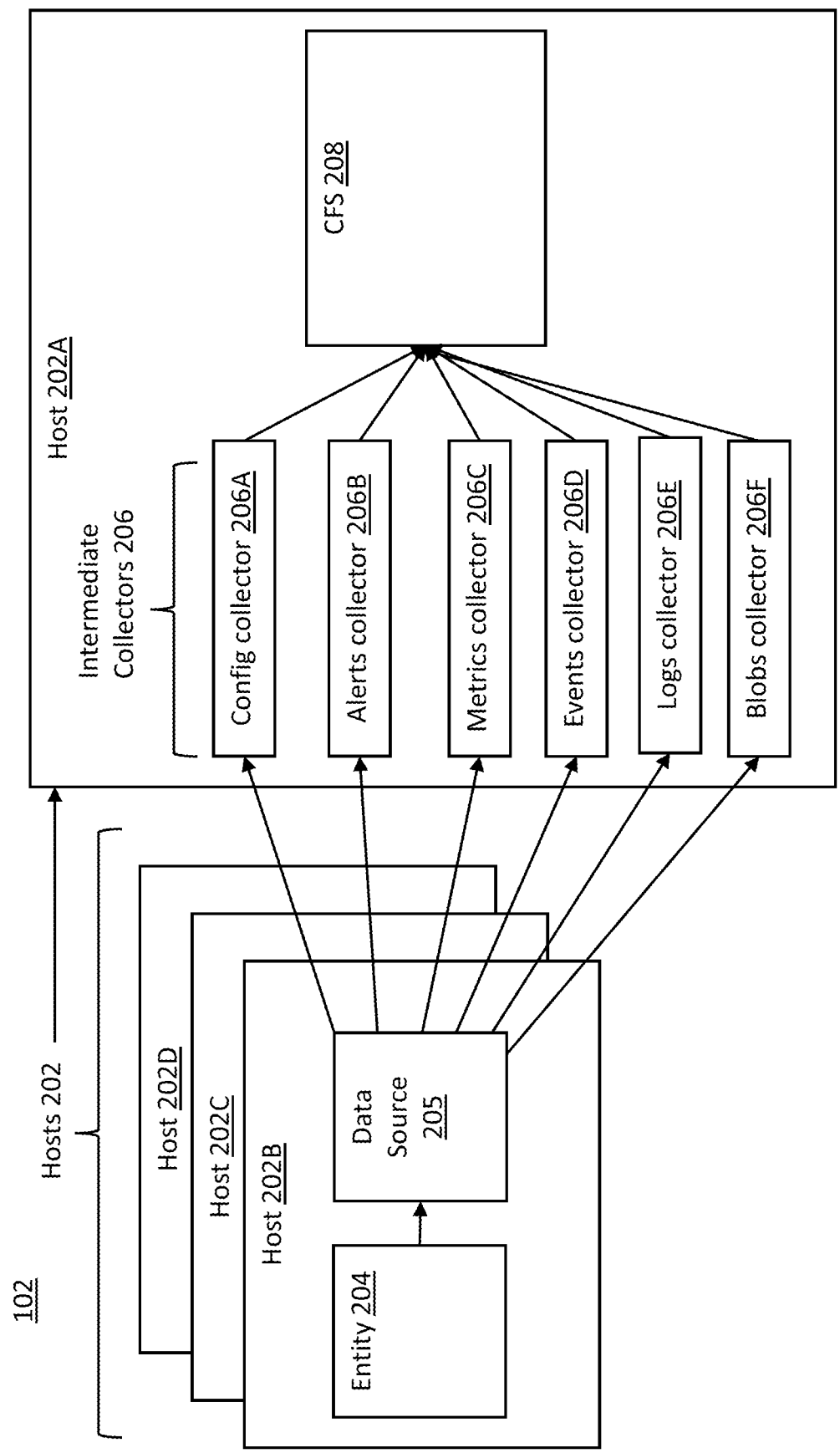
FIG. 2 is an example block diagram of a cluster of the system of FIG. 1, in accordance with some embodiments of the present disclosure.

Referring now to FIG. 2, a block diagram of the cluster 102 is illustrated, in accordance with some embodiments of the present disclosure. The cluster 102 includes a number of hosts 202 (e.g., hosts 202A, 202B, 202C, and 202D). The hosts 202 can be greater than or less than four without departing from the scope of the present disclosure. In some embodiments, the cluster 102 is a hyperconverged (HCI) cluster. In some embodiments, an HCI cluster includes number of disparate resources (e.g., storage, compute, network resources) and, in some embodiments, virtualization resources to virtualize the disparate resources. In some embodiments, a single component (e.g., a cluster management application) deploys, allocates, virtualizes, or otherwise manages the resources (e.g., in a software-defined way). In this way, an HCI can enable scaling (e.g., dynamic scaling) of the disparate resources (e.g., storage can be scaled separately, compute can be scaled separately, all can be scaled together, etc.) without having to add additional hardware or third-party services. The (e.g., hyperconverged) cluster 102 can be located in one data center (e.g., on-premises), in a cloud, across multiple data centers, multiple clouds or across a combination of one or more data centers and one or more clouds (e.g., hybrid cloud).

In some embodiments, the hosts 202 includes one or more entities. For example, as shown in FIG. 2, the host 202B includes an entity 204, although the host 202B can have multiple entities such as the entity 204 while remaining in the scope of the present disclosure. Additionally, each of the hosts 202A, 202C, and 202D can include one or more entities such as the entity 204 without departing from the scope of the present disclosure.

The entity 204 may be a virtual device such as a virtual machine, virtual disk, or a virtual network interface card (NIC). For example, the entity may be a specific virtual machine referred to as "VM1." The entity 204 may be a hardware device such as a central processing unit (CPU), a disk, or a NIC. The entity 204 may a workload (e.g., an application, a service, a software, etc.) hosted (e.g., deployed, running) on a virtual machine (VM), container, or other substrate. The entity 204 may be an application that manages the virtual or hardware devices. For example, the entity can be a virtual machine managing application that manages multiple virtual machines. The application may be one or more of a compute application, an I/O operation (e.g., management) application, a distributed application, a data management application, a cluster management application, a UI application, a cluster health/wellness check management application (e.g., health check manager), a lifecycle management application (e.g., a lifecycle manager), an object storage application, a file storage application, an analytics application, a machine learning application, a computer vision application, a map-reduce application, or the like. Each application such as the entity 204 can output raw telemetry data, which may include one or more of configurations/configuration files, alerts, metrics, events, logs, blobs, metering information, snapshots, etc.

Each of the one or more entities of the hosts 202 includes an entity state. For example, the entity 204 includes an entity state. The entity state includes some or all of the raw telemetry data, such as the configuration, for that entity. The entity state can indicate a configuration of the entity 204 at a point in time. For example, while the entity 204 is powered off, the entity state indicates that the entity 204 is powered off. The entity state can be updated. For example, if the entity 204 changes from being powered off to powered on, and the entity state changes to indicating that the entity 204 is powered on. The update of the entity may be referred to as an event.

In some embodiments, the hosts 202 includes one or more data sources. For example, the host 202B includes a data source 205. The data source 205 can be distributed across multiple hosts. The host 202B may include multiple data sources such as the data source 205. Additionally, each of the hosts 202A, 202C, and 202D can include one or more data sources such as the data source 205 without departing from the scope of the present disclosure.

In some embodiments, the data source 205 is one or more of an in-memory storage (e.g., in-memory database) and persistent storage (e.g., a persistent database). The data source 205 stores the raw telemetry data, including the entity state, provided by the entity 204. In some embodiments, the data source 205 stores raw telemetry data of one or more entities hosted on the host 202B and a second data source hosted on the host 202C stores raw telemetry data of one or more entities hosted on the host 202C. As part of the raw telemetry data, or in addition to the raw telemetry data, the data source 205 an entity type and a time of a last update of the entity state. The entity type may be a task, a virtual machine, a virtual disk, a virtual network interface card, or other type of entity within the scope of the present disclosure. For example, if the entity is "VM1," then the entity type is a virtual machine. The data source 205 may receive one or more of the entity type and the time of last update from the entity 204, or the data source 205 may derive one or more of the entity type and the time of last update from the raw telemetry data received from the entity 204.

In some embodiments, the data source 205 selects a collector to be the "leader" collector and/or selects a host on which the collector is hosted to be a "leader" host. The leader collector can perform dynamic polling as described herein. If the leader host or the leader collector crashes, the data source 205 can select a new leader collector and/or new leader host.

In some embodiments, at least one of the hosts 202 (e.g., host 202A) includes a number of intermediate collectors (e.g., dedicated collectors, single-type collectors, etc.) 206 each of which can collect a corresponding type of telemetry data from the raw telemetry data. The intermediate collectors 206 can collect the telemetry data as separate data streams.

Each of the intermediate collectors 206 are coupled to a data source to receive a corresponding type of telemetry data. In some embodiments, multiple ones of the intermediate collectors 206 are coupled to a same data source 205. In some embodiments, the data source 205 "calls-back" (e.g., notifies) one or more of the intermediate collectors 206 in response to the data source 205 determining that the entity state of the entity 204 is updated (e.g., by receiving or deriving a new time of last update). This may be referred to as a callback, or an update-entity callback. In order to get a callback, the one or more of the intermediate collectors can register a watch with the data source 205.

The collectors can include one or more of a config collector 206A that collects configurations/configuration files, an alerts collector 206B that collects alerts, a metrics collector 206C that collects metrics, an events collector 206D that collects events, a logs collector 206E that collects logs, a blobs collector 206F that collects binary large objects (blobs). In some embodiments, each of the hosts include a number of collectors. In some embodiments, only one host includes a number of collectors. In some embodiments, multiple collectors can be combined into one collector or operate as one intermediate collector. For example, one intermediate collector may collect config, alerts, and metrics.

The logs collector 206E may operate on logs generated from any application from the hosts 202, aggregate the logs, and summarize any issues, e.g., by correlating the logs with other data/metrics/configurations on the system. The config collector 206A may operate on configurations of the cluster 102 and summarize any issues. For example, the config collector 206A may detect that a cluster is configured with 20 MB storage instead of 20 GB storage, or that some VMs are not protected (e.g., not enough replication factor or fault tolerance).

Each of the intermediate collectors 206 may collect telemetry data from the raw telemetry data in a callback mode. When an intermediate collector (e.g., the config collector 206A) of the intermediate collectors 206 is in callback mode, the intermediate collector registers a watch for an entity and receives a callback from the data source 205 when the entity is changed or updated. The intermediate collector receives a callback each time the entity is changed or are updated. In callback mode, in response to the callback, the intermediate collector captures/fetches a latest state of the entity and sends/forwards it to a collector framework service (CFS) 208, e.g., in a memory structure such as a commitlog. In callback mode, updates of the entity result in callbacks and entity states being captured by the intermediate collector and sent to the CFS 208. The frequency of entity updates controls the frequency of entity states sent to the CFS 208. An entity that is updated frequently (e.g., more than once a minute, second, or millisecond) results in large amount of data (e.g., a Gigabyte or a Terabyte) being sent to the CFS 208 may be referred to as a high-frequency entity. The CFS 208 may be overwhelmed by incoming data if a high-frequency entity is updated frequently enough to cause the collector to send an overly large number of commitlogs to the CFS 208.

Each of the intermediate collectors 206 may collect telemetry data from the raw telemetry data in a polling mode. When an intermediate collector of the intermediate collectors 206 is in polling mode, the intermediate collector periodically collects a state of an entity. The intermediate collector may collect the state of the entity at regular intervals. The intermediate collector may send the state of the entity to the CFS 208 in a commitlog (a.k.a., commitlog). The advantage of the polling mode is that it reduces the number of entity states sent to the CFS 208 so the CFS 208 is not overwhelmed with too-frequent updates. However, the polling mode means that updates are not sent to the CFS 208 as rapidly. Updates are not received by the CFS 208 until the intermediate collector polls data source about the entity.

Dynamic polling allows the intermediate collector to switch between the callback mode and the polling mode. Dynamic polling has the advantage of the quick updates of the callback mode and the advantage of avoiding overwhelming the CFS 208 of the polling mode. During dynamic polling, the intermediate collector collects states of entities in callback mode and counts the number of updates for each entity. In some embodiments, the intermediate collector counts the number of updates in a first time period for each entity type to reduce memory pressure. Memory pressure can refer to an indicator that indicates how much memory corresponding to a compute resource such as a virtual machine is being compressed. If the memory pressure indicates that the memory compressed is beyond a threshold, the memory pressure may indicate that the compute resource does not have enough available memory. If the number of updates for an entity or entity type within the first time period exceeds a threshold, the intermediate collector switches to the polling mode for that entity or entity type. The intermediate collector may use polling mode for the entity or entity type for a second time period. Upon completion of the second time period, the intermediate collector may switch to the callback mode for the entity or entity type. In some embodiments, the first time period and the second time period may be equal in length.

At least one host of the hosts 202 (e.g., host 202A) includes the collector framework service (CFS) 208. In some embodiments, the CFS 208 collects each type of telemetry data from the intermediate collectors 206. The CFS 208 can collect the telemetry data from the intermediate collectors 206 as separate data streams. The CFS 208 can summarize or aggregate telemetry data (e.g., monitoring data, summary of configurations, alerts, summary of metrics, events, summary of logs, blobs) received from the intermediate collectors 206 to generate a set of telemetry data (e.g., aggregated telemetry data). In some embodiments, the CFS 208 can send the telemetry data or the summarized/aggregated telemetry data to the server 104 of FIG. 1 for further processing, storage, and/or other operations. In some embodiments, the CFS 208 configures the configuration of each of the intermediate collectors 206. For example, the CFS 208 can define the frequency of collection or how much for the intermediate collectors 206 to aggregate for the corresponding type. In this example, the CFS 208 can define the threshold for an entity or entity type, the first time period within which the number updates is compared to the threshold, and the second time period within which the intermediate collectors 206 are in polling mode. The CFS 208 may define different thresholds, first time periods, and second time periods for different intermediate collectors and/or different entities or entity types.

The CFS 208 may identify when more or different telemetry data is needed and when false positives (e.g., an alert/indication of an issue/problem that does not exist or is otherwise incorrect) are received. The CFS 208 may instruct one or more intermediate collectors 206 to change its configuration. Such an instruction can result from detecting errors/issues/events, identifying an upgrade need, identifying a state change such as an increase in nodes or a change in a hypervisor type, or any of a variety of other triggers to change the configuration. In some embodiments, the CFS 208 collects the raw telemetry data from the applications such as the entity 204. The CFS 208 may perform dynamic polling as described herein when collecting telemetry data from the applications.

In some embodiments, the intermediate collectors 206 are on the same host as the CFS 208. In some embodiments, the intermediate collectors 206 are on different hosts than the CFS 208. In embodiments having multiple clusters 102, each cluster 102 can include a CFS 208. In some embodiments, the intermediate collectors 206 communicate with the CFS 208 using remote procedure calls (RPCs) or application programming interfaces (APIs) (e.g., API calls, API requests). In some embodiments, the CFS 208 communicates with the server 104 using APIs.

Figure 3:
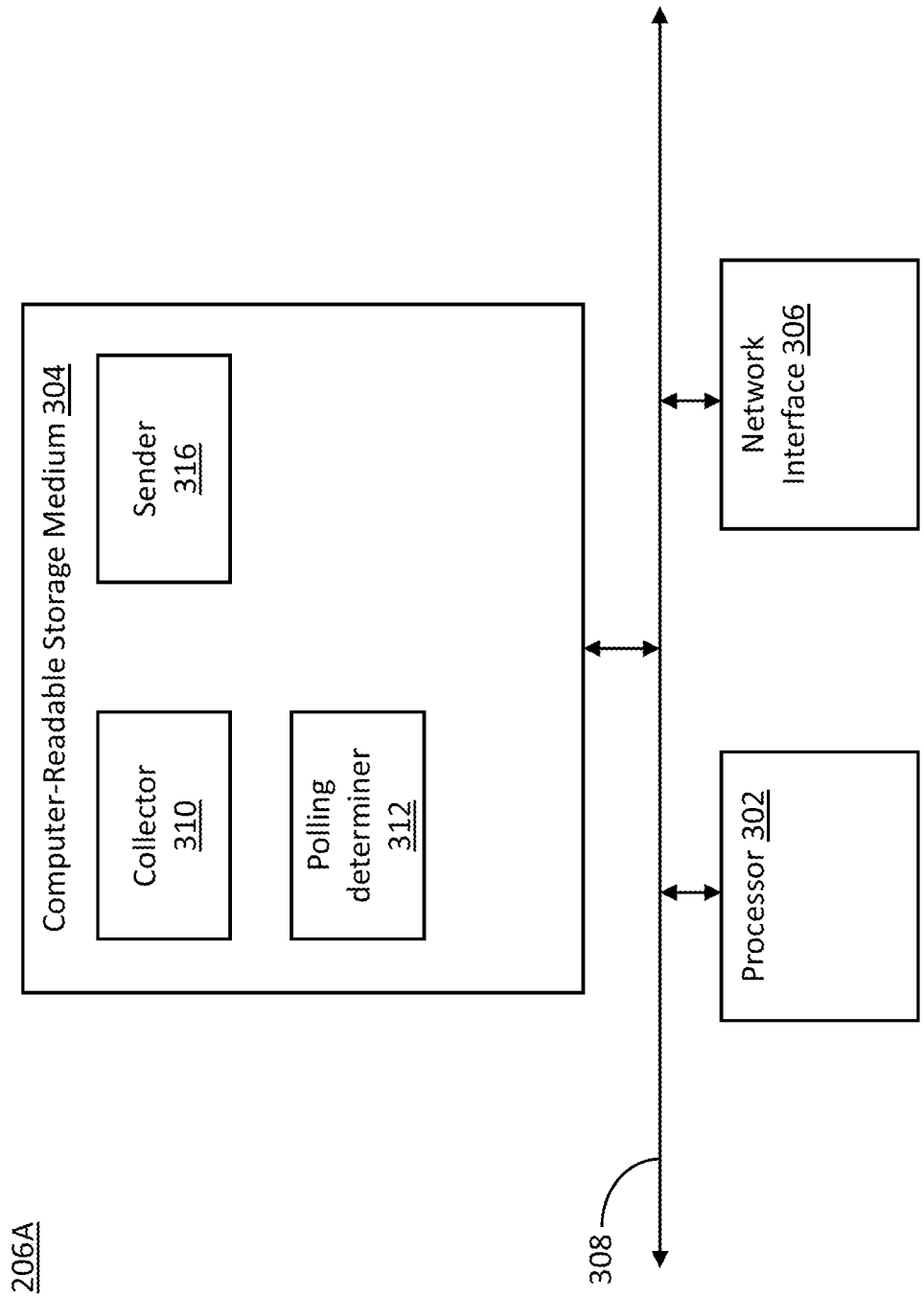
FIG. 3 is an example block diagram of a collector of the cluster of FIG. 2, in accordance with some embodiments of the present disclosure.

Referring now to FIG. 3, a block diagram of the config collector 206A is illustrated, in accordance with some embodiments of the present disclosure. Although FIG. 3 depicts the config collector 206A, FIG. 3 may be applied to any of the intermediate collectors 206 that is coupled to a data source to receive callabacks without departing from the scope of the present disclosure.

The config collector 206A includes a processor 302. Processor 302 is configured to execute computer program code, scripts, applications, services, or plugins. In one or more embodiments, processor 302 is a physical compute resource, a virtual compute resource, a containerized compute resource, central processing unit (CPU), a virtual CPU (vCPU), a multi-processor, a distributed processing system, an application specific integrated circuit (ASIC), and/or a suitable processing unit.

The config collector 206A includes a storage medium 304. In one or more embodiments, the storage medium 304 is an electronic, magnetic, optical, electromagnetic, infrared, and/or a semiconductor system (or apparatus or device). For example, the storage medium 304 includes a semiconductor or solid-state memory, a random access memory (RAM), virtual RAM (vRAM), a read-only memory (ROM), vROM, a magnetic tape, a removable computer diskette, a rigid magnetic disk, and/or an optical disk.

In some embodiments, the storage medium 304 includes a collector 310. The collector 310 can collect (e.g., receive, gather, etc.) telemetry data from hosts in the cluster 102 such as 202B, 202C, and 202D. The collector 310 can collect the telemetry data from the data source 205. The telemetry data can include one or more of the entity type or the time of the last update. The collector 310 can receive callbacks from the data source 205 for events such as entity updates.

In some embodiments, the storage medium 304 includes a polling determiner 312, which may perform dynamic polling as described herein when collecting telemetry data from hosts in the cluster 102. In some embodiments, the polling determiner 312 determines that a callback for an update has been received. In some embodiments, the polling determiner 312 determines whether a number of updates (e.g., a number of updates of the entity 204, a number of updates of entities having the same entity type as the entity 204, etc.) within a time period exceeds a threshold (e.g., in response to determining that a callback has been received for that entity). If the number of updates exceeds the threshold, the polling determiner 312 can cause the collector 310 to cease to collect telemetry data from the data source 205 for the remainder of the time period in response to the number of updates within the time period exceeding the threshold. In other words, the polling determiner 312 can cause the collector 310 to wait until the time period elapses. Responsive to determining that the time period has expired, the polling determiner 312 can poll the data source 205 for the entity state of the entity 204. Once polled, the data source 205 can send the entity state of the entity 204 to the collector 310. If there are multiple updates within the time period, the data source 205 can send, to the collector 310, the entity state of the entity 204 corresponding to the time of the latest entity update of the entity 204. In some embodiments, the polling determiner 312 sets the time period. In some embodiments, the time period is set by the data source 205, a user, an administrator, or a telemetry policy.

In some embodiments, the storage medium 304 includes a sender 316. In some embodiments, the sender 316 provides (e.g., sends, transmits, etc.) the telemetry data including the entity state. The sender 316 may provide the telemetry data to the CFS 208.

In some embodiments, the config collector 206A includes a network interface 306. The sender 316 may provide the telemetry data to the server 104 via the network interface 306. The network interface 306 allows the CFS 208 communicate with other components of the computer system 100. The network interface 306 includes wireless network interfaces such as BLUETOOTH, WIFI, Global System for Mobile Communications (GSM), wideband code division multiple access (WCDMA), Long-Term Evolution (LTE), or 5G; or wired network interfaces such as ETHERNET or Universal serial bus (USB).

In some embodiments, the config collector 206A includes a bus 308. The bus 308 is coupled to, and allows communication between, the processor 302, the computer-readable storage medium 304, and the network interface 306. In some embodiments, the bus 308 is a number of wires, optical fiber, a high-speed bus, etc.

Figure 4A:
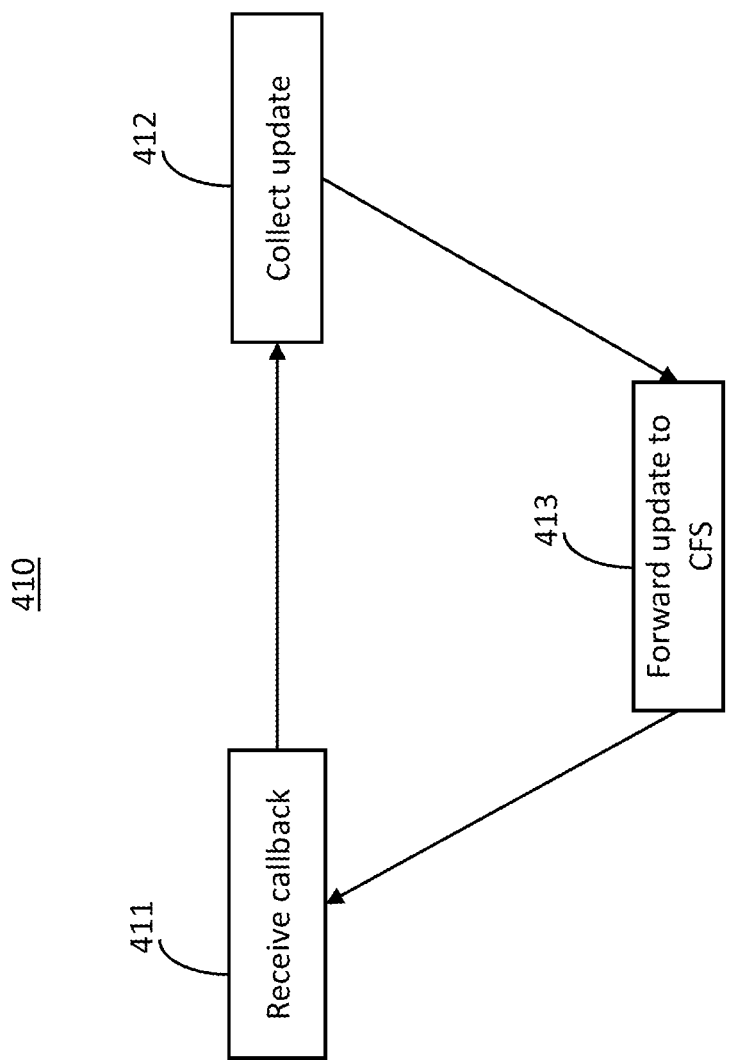
FIG. 4A is an example flow diagram of a method for collecting telemetry data, in accordance with some embodiments of the present disclosure.

FIG. 4A is an example flow diagram of a method 410 for collecting telemetry data, in accordance with some embodiments of the present disclosure. Additional, fewer, or different operations or other embodiments may be performed in the method 410 depending on the embodiment. The method 410 may be implemented using, or performed by, the system 100, one or more components of the system 100 (e.g., the CFS 208 or one or more of the intermediate collectors 206), or a processor associated with system 100 or the one or more components of system 100.

At 411, a callback is received. The method 410 may be a callback method. A callback is received when a collector (e.g., the config collector 206A) registers a watch for an entity. Each time the entity is updated, the collector receives a callback. At 412, in response to receiving the callback, an update is collected. At 413, the update is forwarded to the CFS 208. Each time the entity is updated, a callback is received, and an update is collected and forwarded to the CFS 208. Advantages of this method include receiving rapid updates for entities.

Figure 4B:
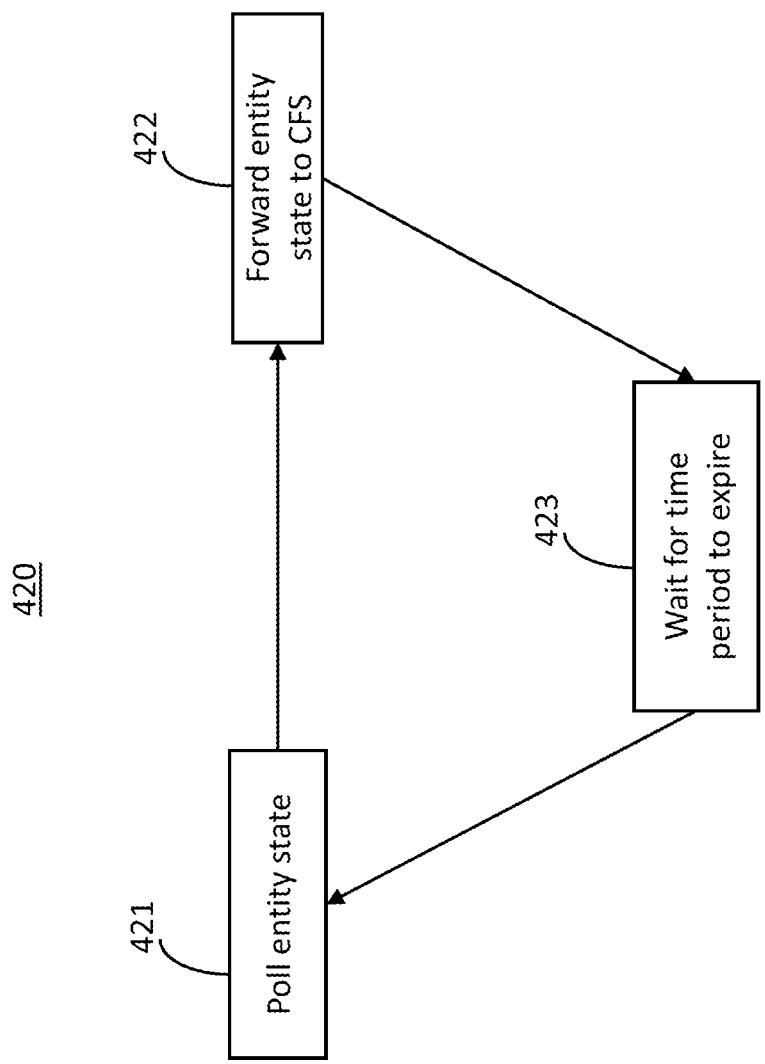
FIG. 4B is an example flow diagram of another method for collecting telemetry data, in accordance with some embodiments of the present disclosure.

FIG. 4B is another example flow diagram of a method 420 for collecting telemetry data, in accordance with some embodiments of the present disclosure. Additional, fewer, or different operations or other embodiments may be performed in the method 420 depending on the embodiment. The method 420 may be implemented using, or performed by, the system 100, one or more components of the system 100 (e.g., the CFS 208 or one or more of the intermediate collectors 206), or a processor associated with system 100 or the one or more components of system 100. The method 420 may be a polling method.

At 421, a collector (e.g., the config collector 206A) polls a data source 205 (e.g., queried) for an entity state of one or more entities such as the entity 204. In some embodiments, the collector fetches the entity state from the data source. At 422, the entity state is forwarded to the CFS 208. In some embodiments, forwarding the entity state to the CFS 208 includes determining whether the entity state has been updated and forwarding the entity state to the CFS 208 in response to the entity state being updated. At 423, a time period expires before the data source 205 is polled again. In some embodiments, the time period remains constant between subsequent polls of the data source 205. In other embodiments, the time period varies between polls of the data source 205. The config collector 206A or the CFS 208 may vary the time period between polls of the data source 205.

Figure 5:
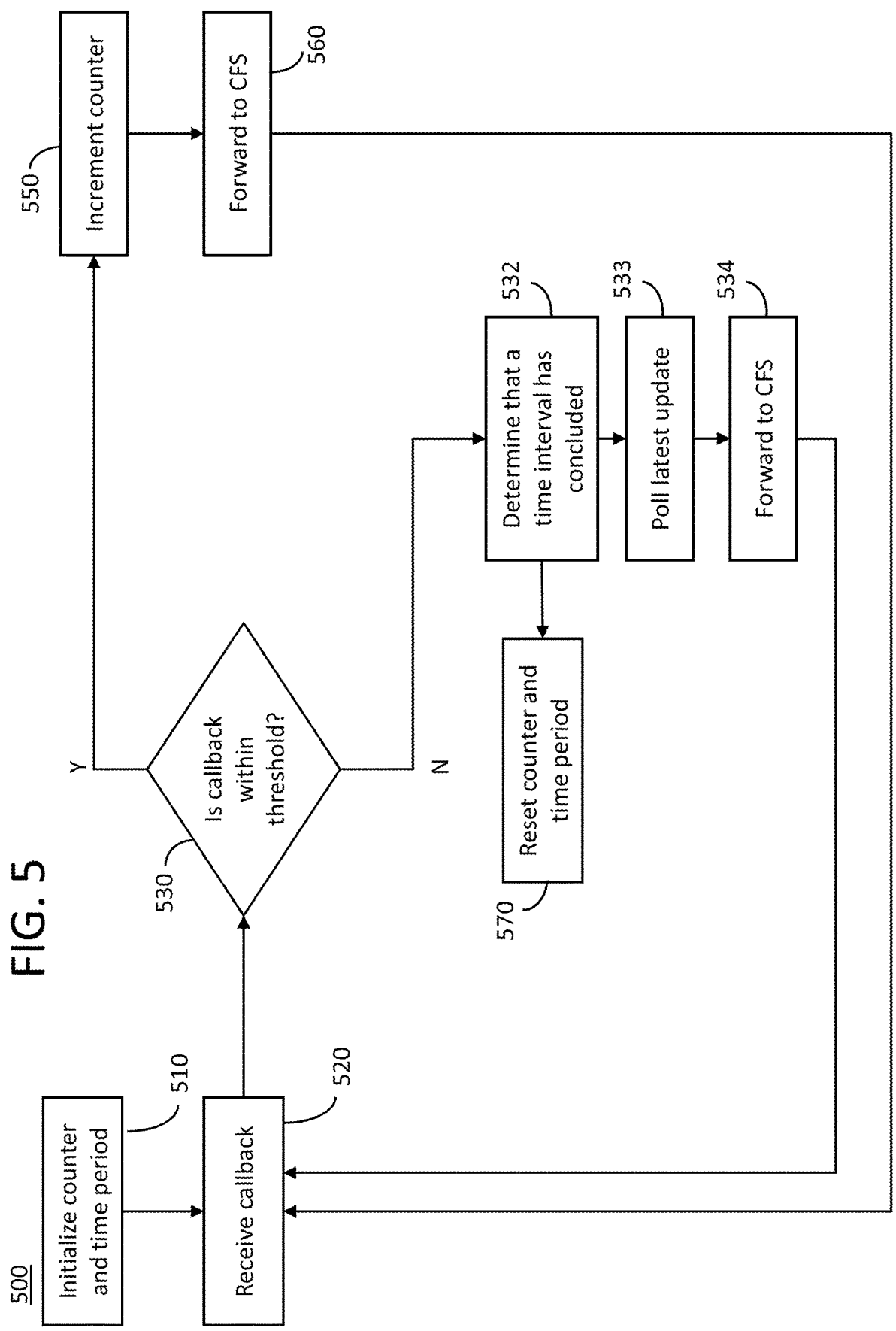
FIG. 5 is an example flow diagram of a method for collecting telemetry data using dynamic polling, in accordance with some embodiments of the present disclosure.

FIG. 5 is an example flow diagram of a method 500 for collecting telemetry data using dynamic polling, in accordance with some embodiments of the present disclosure. The method 500 may be implemented using, or performed by, the system 100, one or more components of the system 100 (e.g., the CFS 208 or one or more of the intermediate collectors 206), or a processor associated with system 100 or the one or more components of system 100. Additional, fewer, or different operations or other embodiments may be performed in the method 500 depending on the embodiment.

At 510, a counter is initialized and a time period is initialized. The counter may be initialized at zero or any other value. In some embodiments, the counter may count updates of an entity 204 or an entity type that the entity 204 is included in (e.g., is a member of, belongs to, etc.). At 520, a callback is received (e.g., from a data source 205). The callback may be received in response to an update of the entity 204. The callback may be received in response to a watch registered on the entity 204. A collector (e.g., the config collector 206A) may receive a callback each time the entity 204 is updated. At 530, whether the callback is within a threshold is determined. The callback may be within the threshold if the counter is below the threshold number. If the callback is within the threshold, at 550, the counter is incremented. At 560, an entity state, including the update of the entity 204 corresponding to the callback, is collected/fetched by the collector (e.g., before the time period is expired) and forwarded to the CFS 208.

If, at 530, the callback is determined to not be within the threshold, then the update corresponding to the update is not collected before the time period or interval has expired (e.g., concluded, elapsed). The callback may be determined to not be within the threshold based on the counter being above the threshold. An identity of the entity 204 for which the update is not collected may be recorded. For example, if a callback for an entity 204 exceeds the threshold, the update is not recorded, but one or more indicators of the entity 204, such as a universal unique identifier (UUID) or the entity type of the entity 204, is stored in memory. In some embodiments, the indicator is stored in configuration storage. A table of entities or entity types for which updates were not collected may be generated.

At 532, it is determined that a time period or interval has concluded or expired. The time interval may be 1 second, 1 minute, 15 minutes, 1 hour, or any value while remaining in the scope of the present disclosure. At 570, the counter and the time period are reset. For example, it may be determined that 15 minutes have elapsed since the counter was initialized or reset. In this example, the counter is reset every 15 minutes. In another example, it may be determined that 15 minutes have elapsed since the callback was determined to not be within the threshold. In yet another example, it may be determined that in the last 15 minutes, an amount of callbacks received does not exceed the threshold. In this example, the 15 minutes are a rolling time period. The timer is updated to reflect how many callbacks have been received in the last 15 minutes.

At 533, the data source 205 is polled for a latest update (e.g., a latest entity state) of the entity 204. At the expiration of the time interval, the data source 205 may be polled for 205 an update of each entity in the table. If the counter corresponds to callbacks received for an entity type, the table may list entities to be polled for each entity type. Dynamic polling based on entity types, as opposed to individual entities, has the advantage of reducing memory pressure relative to counting the number of callbacks for each entity because the number of entities exceeds the number of entity types. In some embodiments, the number of entities greatly exceeds the number of entity types. In some embodiments, the table is stored in configuration storage. At 534, the entity state, including the latest update of the entity 204, is collected by the collector and forwarded to the CFS 208.

In some embodiments, a type of entity is a critical type of entity. Critical types of entities may have updates that should not be delayed. In some embodiments, critical types of entities should not be polled for updates, but should have updates collected and forwarded as they occur. Critical entities may include alerts, metering, billing, configuration parameters for cloud or remote services, or the like. An example of an update from a critical type of entity is an alert concerning hardware failure. In some embodiments, critical types of entities may be associated with thresholds that are so high that they ensure that updates of critical types of entities are always collected. In other embodiments, critical types of entities may be associated with no counter and/or no threshold to ensure that callbacks for critical types of entities are always collected. In yet other embodiments, determining whether the callback is within the threshold at 530 includes determining whether the entity type is a critical type of entity and collecting the update if the entity type is a critical type of entity. The configuration of the collector can be updated to specify that specific types of entities are critical types of entities.

The determination at 530 of whether the callback is within the threshold may be a decision between continuing to use a callback method or switching to a polling method for collecting telemetry data. If the callback is within the threshold, telemetry data may be collected in a manner similar to the callback method of FIG. 4A. If the callback is not within the threshold, telemetry data may be collected in a manner similar to the polling method of FIG. 4B. Switching between the callback method 410 of FIG. 4A and the polling method 420 of FIG. 4B may be dynamic polling.

Figure 6:
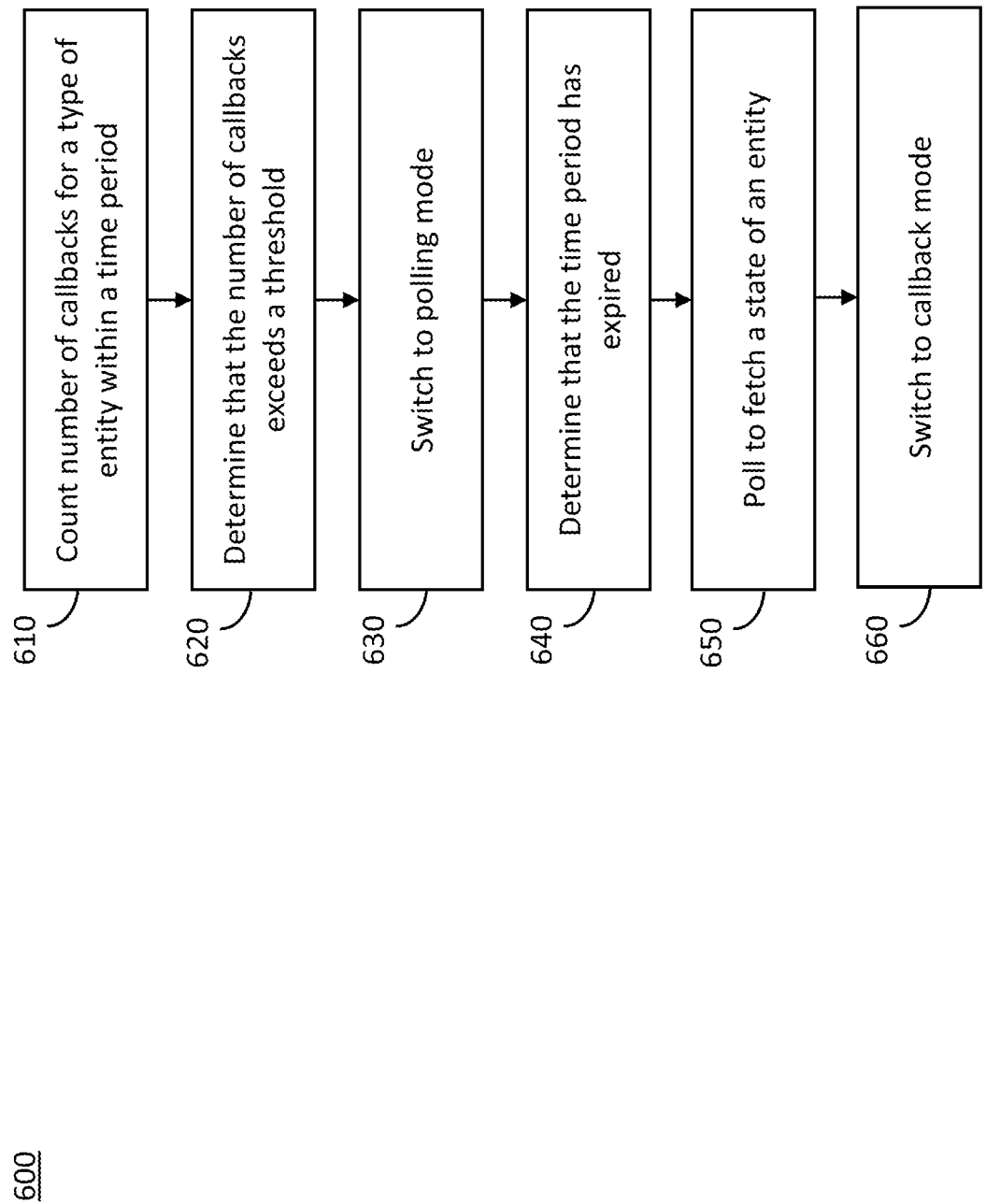
FIG. 6 is an example flow chart of a method for collecting telemetry data using dynamic polling, in accordance with some embodiments of the present disclosure.

FIG. 6 is an example flow chart of a method 600 for collecting telemetry data using dynamic polling, in accordance with some embodiments of the present disclosure. The method 600 may be implemented using, or performed by, the system 100, one or more components of the system 100 (e.g., the config collector 206A), or a processor associated with system 100 or the one or more components of system 100. Additional, fewer, or different operations or other embodiments may be performed in the method 600 depending on the embodiment.

At 610, a processor (e.g., a processor associated with the config collector 206A) counts a number of callbacks for a type of entity (e.g., an entity type that includes the entity 204) received within a time period. The callbacks may be counted as disclosed in FIG. 5, or another way. In some embodiments, the type of entity is at least one of a task, a virtual machine, a virtual disk, or a virtual network interface card. At 620, the processor determines that the number of callbacks within the time period exceeds a threshold. At 630, the processor makes a switch to a polling mode from the callback mode. In some embodiments, the processor ceases to collect updates for the type of entity. At 640, the processor determines that the time period has expired.

At 650, the processor polls (e.g., a data source such as the data source 205) to fetch the entity state of the entities of the type of entity. In an example, a number of callbacks for virtual machines, a type of entity, may be counted during a 15-minute time period beginning at 9:00 with a threshold of 100. From 9:00 to 9:05, 100 callbacks are received and 100 updates are collected. At 9:05, when callback number 101 is received, the update corresponding to callback number 101 is not collected. From 9:05 to 9:15, no updates for virtual machines are collected. At 9:15 it is determined that the time period has expired and the data source is polled to fetch the states of the virtual machines.

At 660, the processor makes a switch to the callback mode. Switches between the callback mode and the polling mode may occur several times. The processor may make the switch from the callback mode to the polling mode each time the number of callbacks in the callback mode for the type of entity within the time period exceeds the threshold. The processor may make the switch from the polling mode to the callback mode each time the time period expires. In some embodiments, the processor may count a number of callbacks received during the polling mode. If the number of callbacks received during the polling mode indicates a high level of updates, the processor may not make the switch from the polling mode to the callback mode at the expiration of the time period. For example, if the number of callbacks received during the polling mode exceeds the threshold or indicates that the number of callbacks in a subsequent time period will exceed the threshold, the processor will not make the switch from the polling mode to the callback mode.

In some embodiments, if the type of entity is a critical type of entity, the collection of updates for the type of entity does not cease. In some embodiments, the processor receives, from a server, a whitelist configuration. In some embodiments, the whitelist configuration specifies a data type accepted by the server. In some embodiments, the processor determines that the entity is a critical entity responsive to determining that the entity is on the whitelist. In some embodiments, the processor collects, based on the whitelist configuration, data corresponding to the data type accepted by the server. In some embodiments, the processor sends the collected data to the server.

Figure 7:
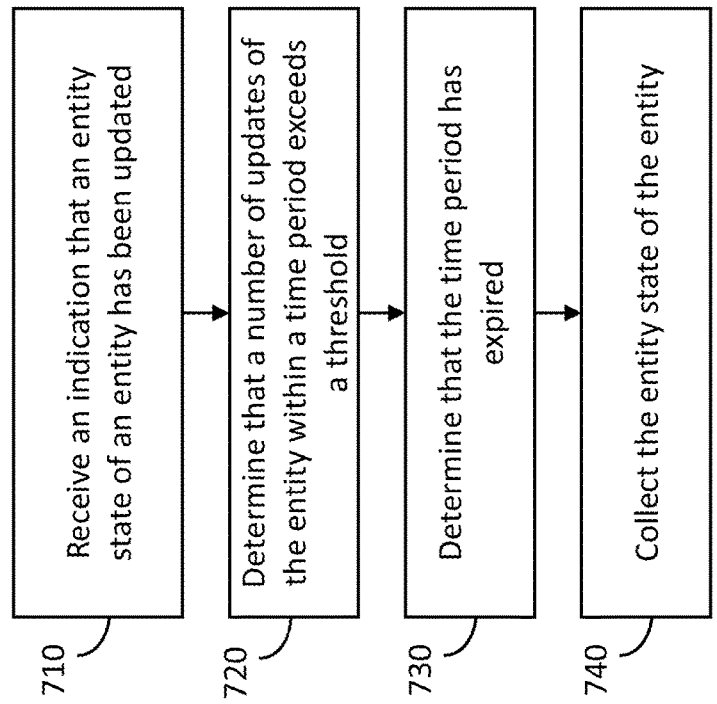
FIG. 7 is another example flow chart of a method for collecting telemetry data using dynamic polling, in accordance with some embodiments of the present disclosure.

FIG. 7 is another example flow chart of a method for collecting telemetry data using dynamic polling, in accordance with some embodiments of the present disclosure. The method 700 may be implemented using, or performed by, the system 100, one or more components of the system 100 (e.g., the config collector 206A), or a processor associated with system 100 or the one or more components of system 100. Additional, fewer, or different operations or other embodiments may be performed in the method 700 depending on the embodiment.

At 710, a processor (e.g., a processor associated with the config collector 206A) receives an indication that an entity state of an entity (e.g., the entity 204) has been updated. In some embodiments, the indication is a callback. In some embodiments, the processor receives the indication (e.g., a callback, an entity-update callback) from a data source (e.g., the data source 205), e.g., in response to the entity state in the data source being updated. In some embodiments, the processor registers a watch with the data source and the data source sends a callback to the processor when the entity state is updated. The indication can be received during a time period. In some embodiments, the time period is a predetermined time period. In some embodiments, the time period is a rolling time period.

At 720, the processor determines that a number of updates of the entity within the time period exceeds a threshold. The processor can determine that the number of updates of the entity within the time period exceeds a threshold in response to the processor receiving the indication that the entity of the entity state has been updated.

In some embodiments, the processor determines that a number of updates of an entity type that the entity is a member of, within the time period exceeds a threshold. The entity type may include at least one of a task, a virtual machine, a virtual disk, or a virtual network interface card. In some embodiments, at least one of the time period or the threshold is based on an entity type. For example, a first entity type may have a lower time period or a higher threshold, and a second entity type may have a higher time period or a lower threshold.

In some embodiments, some entity types are on a whitelist. In some embodiments, the processor determines that the entity is not included in a whitelist. In some embodiments, the processor determines that the entity is included in the whitelist, and the processor collects the entity state of the entity before the time period is elapsed in response to determining that the entity is included in the whitelist.

At 730, the processor determines that the predetermined time period has expired. At 740, the processor collects the entity state of the entity. The processor can collect the entity state of the entity in response to the processor determining that the predetermined time period has expired. In some embodiments, the processor collects the entity state from the data source that provided the indication that the entity state of the entity was updated.

In some embodiments, the processor receives a second indication that the entity state of the entity has been updated. In some embodiments, the processor, in response to receiving the second indication that the entity state of the entity has been updated, determines that the number of updates of the entity within the time period does not exceed the threshold. In some embodiments, the processor, in response to determining that the number of updates of the entity within the time period does not exceed the threshold, collects the entity state of the entity. In some embodiments, processor receives the second indication before the indication and the processor collects the entity state based on the second indication before the processor collects the entity state based on the indication. In some embodiments, processor receives the second indication after the indication and the processor collects the entity state based on the second indication after the processor collects the entity state based on the indication.

In some embodiments, the processor receives, from a server, a whitelist configuration. In some embodiments, the whitelist configuration specifies an entity type accepted by the server. In some embodiments, the processor collects, based on the whitelist configuration, telemetry data corresponding to the entity type accepted by the server. In some embodiments, the processor sends the collected telemetry data to the server.

Figure 8:
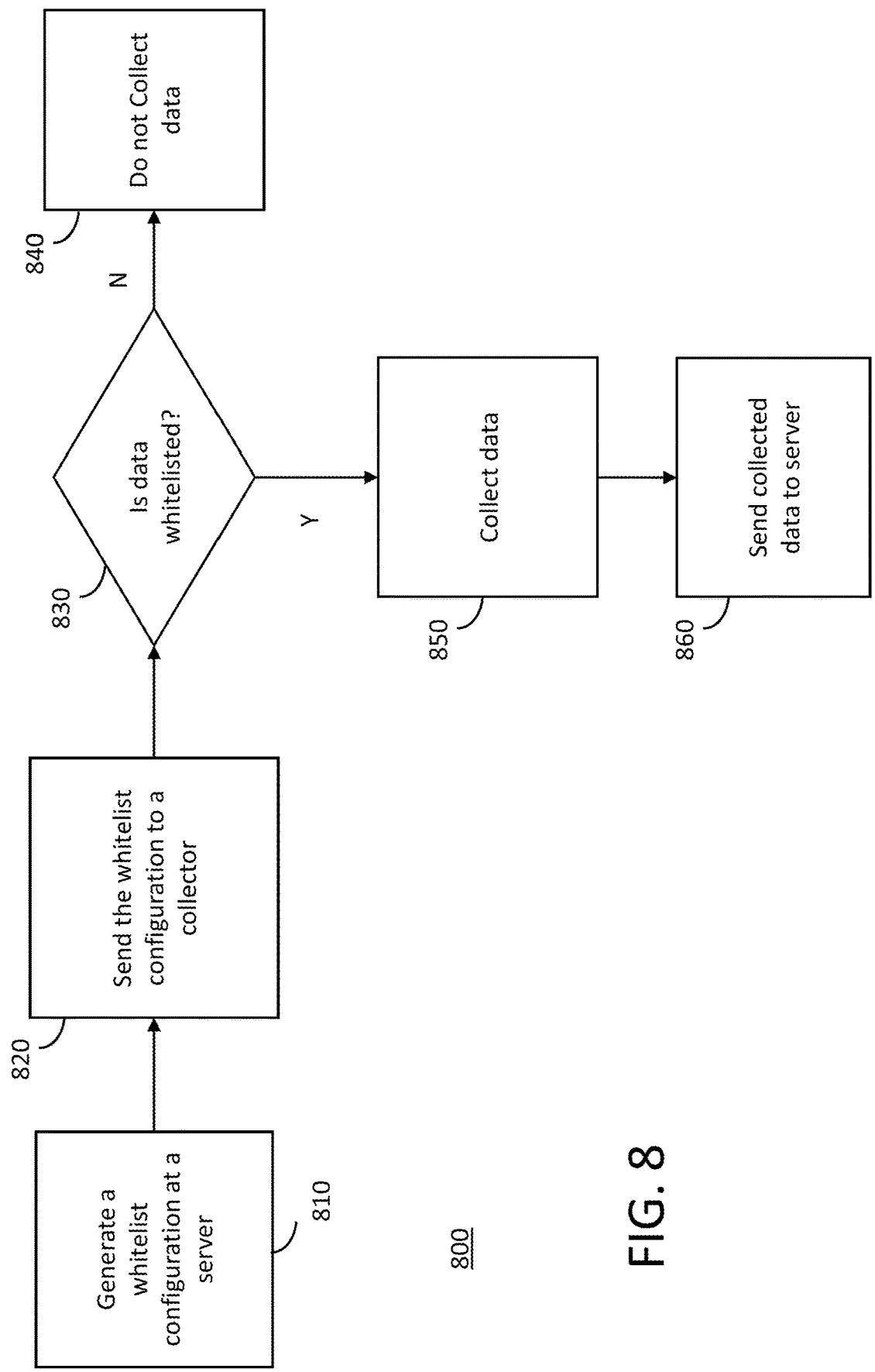
FIG. 8 is an example flow diagram of a method for collecting telemetry data based on a server whitelist, in accordance with some embodiments of the present disclosure.

FIG. 8 is an example flow diagram of a method 800 for collecting telemetry data based on a server whitelist, in accordance with some embodiments of the present disclosure. The method 800 may be implemented using, or performed by, the system 100, one or more components of the system 100 (e.g., one or more of the intermediate collectors 206, the CFS 208, the server 104, or a combination thereof), or a processor associated with system 100 or the one or more components of system 100. Additional, fewer, or different operations or other embodiments may be performed in the method 800 depending on the embodiment.

At 810, a server may generate a whitelist configuration. The whitelist configuration may list data which is acceptable to the server. Data that is not listed in the whitelist configuration may be dropped if received at the server. At 820, the server may send the whitelist configuration to a collector. The collector may be configured to send data to the server. At 830, whether data is whitelisted is determined. In some embodiments, the collector may determine whether data is whitelisted. At 840, the collector does not collect the data in response to determining that the data is not whitelisted. At 850, the data is collected in response to determining that the data is whitelisted. The data may be collected by the collector. At 860, the collector sends the collected data to the server. The collector may send the collected data to the server. The server may accept the collected data. The method 800 has the advantage of limiting what is sent to the server from the collector to only that data which the server will accept. This reduces bandwidth usage by the collector by limiting what data is sent based on what will be accepted by the server. Sending data to the server which will be dropped by the server is a waste of bandwidth. This is especially important in metered services where customers are charged based on how much data is sent out of the cloud. Customers can save money and bandwidth by sending only data that will be accepted by the server out of the cloud.

Figure 9:
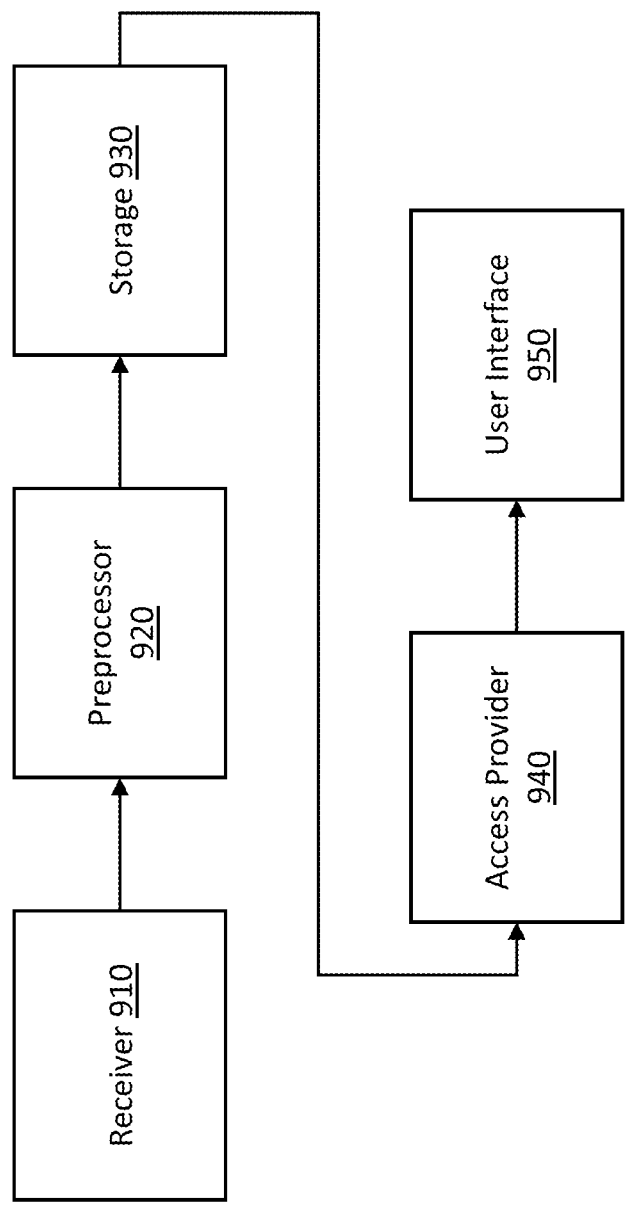
FIG. 9 is an example block diagram of a server of the system of FIG. 1, in accordance with some embodiments of the present disclosure.

FIG. 9 is an example block diagram of a server 104 of the system of FIG. 1, in accordance with some embodiments of the present disclosure. The server 104 can be remote from the cluster 102 and the client 106. The server 104 can be hosted on a cloud, a public cloud, a private cloud, on-premises, on a data center, etc.

In some embodiments, the server 104 includes a receiver 910. In some embodiments, the receiver 910 receives the telemetry data. The receiver 910 can receive the telemetry data at an API endpoint. In some embodiments, the receiver 910 load balances across multiple pods (e.g., using an application load balancer hosted thereon). The receiver 910 can run on top of a Kubernetes framework. The receiver 910 is stateless/compute only, in some embodiments, which can make the receiver 910 more scalable.

In some embodiments, the receiver 910 batches (e.g., aggregates) the telemetry data before sending the batched telemetry data to the preprocessor 920.

In some embodiments, the server 104 includes a preprocessor 920 in communication with the receiver 910. In some embodiments, the preprocessor 920 reads the telemetry data from the receiver 910. In some embodiments the preprocessor 920 performs preprocessing operations such as data validation, data cleansing, schema validation, customer enrichment, segregating data. In some embodiments, the preprocessor 920 includes a customer license database.

In some embodiments, the preprocessor 920 reads the telemetry data from the receiver 910 as a data stream. In some embodiments, the preprocessor 920 reads the telemetry data from the receiver 910 as either as batched or non-batched telemetry data. The preprocessor 920 can process batches of telemetry data (e.g., process telemetry data in batch). In some embodiments, the preprocessor 920 receives batched data in a first (e.g., batched) data stream and non-batched data in a second (e.g., non-batched) data stream. In some embodiments, the preprocessor 920 prioritizes the second data stream over the first data stream (e.g., by preprocessing the telemetry data in the second data stream first). The preprocessor 920 can process telemetry data that is not batched. In some embodiments, the preprocessor 920 processes non-batched telemetry data in response to receiving the indication priority indication. Advantageously, processing non-batched telemetry data can reduce the end-to-end latency for providing high priority telemetry data to the client 106.

In some embodiments, the preprocessor 920 discards or drops data that is not acceptable to the server. In some embodiments, data may be unacceptable because it is not of a type utilized by the server. For example, a metering server may only utilize metering data and drop all other data. If a stream of data that contains various types of data, the preprocessor of the metering server will drop the data that is not metering data. Sending the stream of data containing various types of data when the metering server accepts only metering data results in wasted bandwidth.

In some embodiments, the server 104 includes a storage 930 in communication with the preprocessor 920. The preprocessor 920 can write to the storage 930. The storage 930 can include a software as a service (SaaS) or an online analytical processing (OLAP) database. The SaaS or database can be used for interactive queries, user interface (UI), dashboard. The SaaS or database can store outputs of simple to medium queries. The storage 930 can include a data lake. The data lake can store long running jobs and outputs of medium to high complexity. The data lake can offer long-term retention.

In some embodiments, the server 104 includes an access provider 940 in communication with the storage 930. The access provider 940 can provide a user interface (UI) 510 access to the telemetry data stored in the storage 930. The access provider 940 may include access APIs to provide applications with access to the telemetry data. The APIs may include representational transfer (REST) APIs. The access provider 940 can write and schedule jobs to process the telemetry data. The job may be parallel computation including of multiple tasks that get spawned in response to an action or request.

In some embodiments, the server 104 includes the UI 950 in communication with the access provider 940. The UI 950 can be a portal or other UI to be accessed by the client 106. The UI 950 can display the telemetry data, a summary of telemetry data, output of a job, or any other output data derived from the telemetry data. The UI 950 may (e.g., UI 950 may allow the client 106 to) proactively monitor, provide alerts for, and support applications in the cluster 102 such as the entity 204. The UI 950 may present the telemetry data or output data as a table, graph, text, or in any other visual manner suitable for monitoring, providing alerts for, and supporting applications.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "similar," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus comprising a processor and a memory, the memory comprising programmed instructions that, when executed by the processor, cause the apparatus to:
   receive a first indication that an entity state of an entity has been updated;
   in response to receiving the first indication that the entity has been updated, collect an update of the state of the entity;
   receive a second indication that an entity state of an entity has been updated;
   in response to receiving the second indication that the entity has been updated, determine that a number of updates of the entity within a time period exceeds a threshold;
   based on the number of updates of the entity within the time period exceeding the threshold, cease to collect updates of the entity for a remainder of the time period;
   determine that the time period has expired; and
   in response to determining that the time period has expired, collect the entity state of the entity.

2. The apparatus of claim 1, wherein receiving the indication that the entity state of the entity has been updated comprises receiving, from a data source, the indication that the entity state of the entity has been updated, wherein the data source is coupled to the entity.

3. The apparatus of claim 2, wherein collecting the entity state of the entity comprises collecting the entity state from the data source that provided the indication that the entity state of the entity has been updated.

4. The apparatus of claim 1, wherein at least one of the time period or the threshold is based on an entity type that the entity is a member of.

5. The apparatus of claim 4, the memory comprising the programmed instructions that, when executed by the processor, cause the apparatus to:
   determine that the entity type is not included in a whitelist.

6. The apparatus of claim 4, wherein the entity type is at least one of a task, a virtual machine, a virtual disk, or a virtual network interface card.

7. The apparatus of claim 1, the memory comprising the programmed instructions that, when executed by the processor, cause the apparatus to:
   receive a second indication that the entity state of the entity has been updated;
   in response to receiving the second indication that the entity state of the entity has been updated, determine that the number of updates of the entity within the time period does not exceed the threshold; and
   in response to determining that the number of updates of the entity within the time period does not exceed the threshold, collect the entity state of the entity.

8. The apparatus of claim 1, the memory comprising the programmed instructions that, when executed by the processor, cause the apparatus to:
   receive, from a server, a whitelist configuration, wherein the whitelist configuration specifies an entity type accepted by the server;
   collect, based on the whitelist configuration, telemetry data corresponding to the entity type accepted by the server; and
   send the collected telemetry data to the server.

9. A non-transitory computer readable storage medium comprising instructions stored thereon that, when executed by a processor, cause the processor to:
   receive a first indication that an entity state of an entity has been updated;
   in response to receiving the first indication that the entity has been updated, collect an update of the state of the entity;
   receive a second indication that an entity state of an entity has been updated;
   in response to receiving the second indication that the entity has been updated, determine that a number of updates of the entity within a time period exceeds a threshold;
   based on the number of updates of the entity for a remainder of the time period exceeding the threshold, cease to collect updates of the entity within the time period;
   determine that the time period has expired; and
   in response to determining that the time period has expired, collect the entity state of the entity.

10. The medium of claim 9, wherein receiving the indication that the entity state of the entity has been updated comprises receiving, from a data source, the indication that the entity state of the entity has been updated, wherein the data source is coupled to the entity.

11. The medium of claim 9, wherein collecting the entity state of the entity comprises collecting the entity state from the data source that provided the indication that the entity state of the entity has been updated.

12. The medium of claim 9, wherein at least one of the time period or the threshold is based on an entity type that the entity is a member of.

13. The medium of claim 12, further comprising instructions that, when executed by the processor, cause the processor to:
   determine that the entity type is not included in a whitelist.

14. The medium of claim 9, further comprising instructions that, when executed by the processor, cause the processor to:
   receive a second indication that the entity state of the entity has been updated;
   in response to receiving the second indication that the entity state of the entity has been updated, determine that the number of updates of the entity within the time period does not exceed the threshold; and
   in response to determining that the number of updates of the entity within the time period does not exceed the threshold, collect the entity state of the entity.

15. A computer-implemented method comprising:
   receiving a first indication that an entity state of an entity has been updated;

in response to receiving the first indication that the entity has been updated, collecting an update of the state of the entity;
receiving a second indication that an entity state of an entity has been updated;
in response to receiving the second indication that the entity has been updated, determining that a number of updates of the entity within a time period exceeds a threshold;
based on the number of updates of the entity within the time period exceeding the threshold, ceasing to collect updates of the entity for a remainder of the time period;
determining that the time period has expired; and
in response to determining that the time period has expired, collecting the entity state of the entity.

16. The method of claim 15, wherein receiving the indication that the entity state of the entity has been updated comprises receiving, from a data source, the indication that the entity state of the entity has been updated, wherein the data source is coupled to the entity.

17. The method of claim 15, wherein collecting the entity state of the entity comprises collecting the entity state from the data source that provided the indication that the entity state of the entity has been updated.

18. The method of claim 15, wherein at least one of the time period or the threshold is based on an entity type that the entity is a member of.

19. The method of claim 18, further comprising:
determining that the entity type is not included in a whitelist.

20. The method of claim 15, further comprising:
receiving a second indication that the entity state of the entity has been updated;
in response to receiving the second indication that the entity state of the entity has been updated, determining that the number of updates of the entity within the time period does not exceed the threshold; and
in response to determining that the number of updates of the entity within the time period does not exceed the threshold, collecting the entity state of the entity.

21. An apparatus comprising a processor and a memory, the memory comprising programmed instructions that, when executed by the processor, cause the apparatus to:
receive a first indication that an entity state of an entity has been updated;
in response to receiving the first indication that the entity has been updated, retrieving, based on a callback mode, the updated entity state;
receive a second indication that the entity state of the entity has been updated;
in response to receiving the second indication that the entity has been updated, determine that a number of updates of the entity within a first time period exceeds a threshold;
based on the number of updates of the entity within the time period exceeding the threshold, switch to a polling mode such that the number of updates of the entity collected is reduced relative to the callback mode;
based on the polling mode, periodically poll the entity for updates for a remainder of the time period;
determine that the time period has expired; and
in response to determining that the time period has expired, switch to the callback mode.

22. The apparatus of claim 21, wherein receiving the indication that the entity state of the entity has been updated comprises receiving, from a data source, the indication that the entity state of the entity has been updated, wherein the data source is coupled to the entity.

23. The apparatus of claim 22, wherein collecting the entity state of the entity comprises collecting the entity state from the data source that provided the indication that the entity state of the entity has been updated.

24. The apparatus of claim 21, wherein at least one of the time period or the threshold is based on an entity type that the entity is a member of.

25. The apparatus of claim 24, the memory comprising the programmed instructions that, when executed by the processor, cause the apparatus to:
determine that the entity type is not included in a whitelist.

26. The apparatus of claim 24, wherein the entity type is at least one of a task, a virtual machine, a virtual disk, or a virtual network interface card.

27. The apparatus of claim 21, the memory comprising the programmed instructions that, when executed by the processor, cause the apparatus to:
receive a second indication that the entity state of the entity has been updated;
in response to receiving the second indication that the entity state of the entity has been updated, determine that the number of updates of the entity within a second time period subsequent the time period does not exceed the threshold; and
in response to determining that the number of updates of the entity within the second time period does not exceed the threshold, collect the entity state of the entity in the callback mode.

28. The apparatus of claim 21, the memory comprising the programmed instructions that, when executed by the processor, cause the apparatus to:
receive, from a server, a whitelist configuration, wherein the whitelist configuration specifies an entity type accepted by the server;
collect, based on the whitelist configuration, telemetry data corresponding to the entity type accepted by the server; and
send the collected telemetry data to the server.

* * * * *